United States Patent
Bodog et al.

(10) Patent No.: US 9,813,928 B2
(45) Date of Patent: Nov. 7, 2017

(54) MINIMIZATION OF DRIVE TESTS DATA AND RADIO LINK FAILURE INFORMATION CORRELATION

(75) Inventors: Gyula Bodog, Budapest (HU); Anatoly Andrianov, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/356,192

(22) PCT Filed: Nov. 3, 2011

(86) PCT No.: PCT/US2011/059145
§ 371 (c)(1),
(2), (4) Date: Jun. 17, 2014

(87) PCT Pub. No.: WO2013/066333
PCT Pub. Date: May 10, 2013

(65) Prior Publication Data
US 2014/0349583 A1    Nov. 27, 2014

(51) Int. Cl.
*H04W 24/10* (2009.01)
*H04W 24/08* (2009.01)

(52) U.S. Cl.
CPC ............ *H04W 24/10* (2013.01); *H04W 24/08* (2013.01)

(58) Field of Classification Search
USPC ...................................................... 455/67.11
See application file for complete search history.

(56) References Cited

U.S. PATENT DOCUMENTS

| | | | | |
|---|---|---|---|---|
| 2010/0113000 A1* | 5/2010 | Yao | ...................... | H04W 24/08 455/422.1 |
| 2010/0165836 A1* | 7/2010 | Wahlqvist | ........... | H04W 76/028 370/225 |
| 2011/0195668 A1* | 8/2011 | Lee | ..................... | H04W 76/046 455/67.11 |
| 2011/0222511 A1* | 9/2011 | Weng | .................... | H04W 24/08 370/331 |
| 2011/0250880 A1* | 10/2011 | Olsson | ................ | H04W 76/027 455/423 |
| 2011/0319115 A1* | 12/2011 | Racz | ..................... | H04W 24/10 455/514 |
| 2012/0309431 A1* | 12/2012 | Bodog | .................. | H04W 16/18 455/456.6 |

(Continued)

OTHER PUBLICATIONS

3rd Generation Partnership Project; Technical Specification Group Services and System Aspects; Telecommunication management; Integration of device management information with Itf-N (Release 10), Jun. 2010.*

(Continued)

*Primary Examiner* — Nay A Maung
*Assistant Examiner* — Erica Fleming-Hall
(74) *Attorney, Agent, or Firm* — Squire Patton Boggs (US) LLP

(57) ABSTRACT

A method, apparatus, system, and computer-readable medium is provided for performing RLF functionality within a trace functionality. As part of trace functionality, RLF information, in the form of one or more RLF reports, is collected. When MDT information is also collected as part of trace functionality, the RLF information and the MDT information is correlated.

16 Claims, 8 Drawing Sheets

(56) References Cited

U.S. PATENT DOCUMENTS

2012/0315949 A1* 12/2012 Zhang .................. H04W 24/08
                                                              455/525
2013/0084888 A1*  4/2013 Johansson ............. H04W 24/08
                                                              455/456.1

OTHER PUBLICATIONS

3GPP TS 37.320 V10.3.0 (Sep. 2011); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).
International Search Report and Written Opinion dated Mar. 16, 2012 corresponding to International Patent Application No. PCT/US2011/059145.
European Search Report dated Feb. 5, 2016 corresponding to European Patent Application No. 11875215.3.
Ericsson, "RLF reporting in MDT trace," 3GPP Draft, S5-112964 (revision of S5-112433), 3GPP TSG-SA5 (Telecom Management), Meeting SA5#79, Oct. 10-14, 2011, Nanjing, P.R. China, Sep. 30, 2011, XP050551752, pp. 1-3.
ZTE, "MDT support for the RLF report," 3GPP Draft; R2-113818, 3GPP TSG RAN WG2 #75, Athens, Greece, Aug. 22-26, 2011, Aug. 17, 2011, XP050540165, pp. 1-3.
3GPP TS 32.422 V11.1.0 (Sep. 2011); 3rd Generation Partnership Project; Technical Specification Group Services and System Aspects; Telecommunication management; Subscriber and equipment trace; Trace control and configuration management (Release 11).
S5-112433; Ericsson; "RLF reporting in MDT trace"; 3GPP TSG-SA5 (Telecom Management); Meeting SA5#78, Aug. 22-26, 2011, Istanbul, Turkey.
Korean Office Action application No. 10-2014-7015124 dated Jun. 16, 2015.

* cited by examiner

MINIMIZATION OF DRIVE TESTS DATA AND RADIO LINK FAILURE INFORMATION CORRELATION

BACKGROUND

Field

Some embodiments of the invention relate generally to communication systems, and particularly to Long Term Evolution (LTE)-Advanced communication systems, Universal Mobile Telecommunications System (UMTS) communication systems, and other radio communication systems. Certain embodiments also generally relate to automatic collection of user equipment measurements and radio link failure reporting.

Description of the Related Art

In conventional systems, network optimization generally takes the form of drive tests that are performed manually by network operators. Drive tests can include manually moving a user equipment (UE) through one or more cells of a network and manually recording measurements of the UE as it moves through the network. These drive tests can be expensive, and thus, there have been efforts directed towards minimization of drive tests (MDT). Efforts related to MDT have been directed to defining automatic collection of UE measurements, to enable easier monitoring of network performance, and, consequently, to replace expensive manual drive tests. MDT functionality generally requires relevant input from the UE, and thus, involvement of the UEs in generally necessary to implement MDT functionality. MDT functionality is further described in greater detail in 3GPP Technical Specification 37.320, "Radio Measurement Collection for Minimization of Drive Tests (MDT); Overall Description; Stage 2; (Release 10)."

Another functionality that is present in conventional systems is radio link failure (RLF) reporting. An RLF can occur, causing a UE to lose connectivity with a network. A UE can capture one or more radio conditions when an RLF occurs, and can transmit the one or more radio conditions within an RLF report, once the UE is able to connect to the network. RLF reporting functionality is defined independently from MDT functionality. RLF reporting is generally mandatory for the UE while MDT is generally optional.

SUMMARY

According to an embodiment of the invention, a method that is implemented by a network element includes receiving a trace session activation request including a job type parameter indicating radio link failure information collection. The method further includes receiving radio link failure information after a radio link failure. The method further includes associating the radio link failure information with a user equipment context. The method further includes storing the radio link failure information within a trace record. The method further includes transmitting the trace record to a trace collection entity.

According to another embodiment, an apparatus includes a processor and a memory including computer program code. The memory and the computer program code are configured to, with the processor, cause the apparatus at least to receive a trace session activation request including a job type parameter indicating radio link failure information collection. The memory and the computer program code are further configured to, with the processor, cause the apparatus at least to receive radio link failure information after a radio link failure. The memory and the computer program code are further configured to, with the processor, cause the apparatus at least to associate the radio link failure information with a user equipment context. The memory and the computer program code are further configured to, with the processor, cause the apparatus at least to store the radio link failure information within a trace record. The memory and the computer program code are further configured to, with the processor, cause the apparatus at least to transmit the trace record to a trace collection entity.

According to another embodiment, an apparatus includes means for receiving a trace session activation request including a job type parameter indicating radio link failure information collection. The apparatus further includes means for receiving radio link failure information after a radio link failure. The apparatus further includes means for associating the radio link failure information with a user equipment context. The apparatus further includes means for storing the radio link failure information within a trace record. The apparatus further includes means for transmitting the trace record to a trace collection entity.

According to another embodiment, a computer-readable medium includes a computer program stored therein that, when executed by a processor, causes the processor to implement a method. The method includes receiving a trace session activation request including a job type parameter indicating radio link failure information collection. The method further includes receiving radio link failure information after a radio link failure. The method further includes associating the radio link failure information with a user equipment context. The method further includes storing the radio link failure information within a trace record. The method further includes transmitting the trace record to a trace collection entity.

According to another embodiment, a method that is implemented by a network element includes receiving a trace session activation request including a job type parameter indicating minimization of drive tests activation. The method further includes activating a minimization of drive tests measurements at a user equipment. The method further includes receiving minimization of drive tests information from the user equipment. The method further includes associating the minimization of drive tests information with a user equipment context. The method further includes storing the minimization of drive tests information within a trace record according to the user equipment context. The method further includes transmitting the trace record to a collection entity.

According to another embodiment, an apparatus includes a processor and a memory including computer program code. The memory and the computer program code are configured to, with the processor, cause the apparatus at least to receive a trace session activation request including a job type parameter indicating minimization of drive tests activation. The memory and the computer program code are further configured to, with the processor, cause the apparatus at least to activate a minimization of drive tests measurements at a user equipment. The memory and the computer program code are further configured to, with the processor, cause the apparatus at least to receive minimization of drive tests information from the user equipment. The memory and the computer program code are further configured to, with the processor, cause the apparatus at least to associate the minimization of drive tests information with a user equipment context. The memory and the computer program code are further configured to, with the processor, cause the apparatus at least to store the minimization of drive tests information within a trace record according to the user equipment context. The memory and the computer program code are further configured to, with the processor, cause the apparatus at least to transmit the trace record to a collection entity.

According to another embodiment, an apparatus includes means for receiving a trace session activation request including a job type parameter indicating minimization of drive tests activation. The apparatus further includes means for activating a minimization of drive tests measurements at a user equipment. The apparatus further includes means for receiving minimization of drive tests information from the user equipment. The apparatus further includes means for associating the minimization of drive tests information with a user equipment context. The apparatus further includes means for storing the minimization of drive tests information within a trace record according to the user equipment context. The apparatus further includes means for transmitting the trace record to a trace collection entity.

According to another embodiment, a computer-readable medium includes a computer program stored therein that, when executed by a processor, causes the processor to implement a method. The method includes receiving a trace session activation request including a job type parameter indicating minimization of drive tests activation. The method further includes activating a minimization of drive tests measurements at a user equipment. The method further includes receiving minimization of drive tests information from the user equipment. The method further includes associating the minimization of drive tests information with a user equipment context. The method further includes storing the minimization of drive tests information within a trace record according to the user equipment context. The method further includes transmitting the trace record to a collection entity.

According to another embodiment, a method that is implemented by a network element includes receiving a trace session activation request including a job type parameter indicating minimization of drive tests activation and radio link failure information collection. The method further includes receiving minimization of drive tests information and radio link failure information. The method further includes associating the minimization of drive tests information and the radio link failure information with a user equipment context. The method further includes correlating the minimization of drive tests information and the radio link failure information. The method further includes storing the minimization of drive tests information and the radio link failure information within a trace record according to the user equipment context. The method further includes transmitting the trace record to a collection entity.

According to another embodiment, an apparatus includes a processor and a memory including computer program code. The memory and the computer program code are configured to, with the processor, cause the apparatus at least to receive a trace session activation request including a job type parameter indicating minimization of drive tests activation and radio link failure information collection. The memory and the computer program code are further configured to, with the processor, cause the apparatus at least to receive minimization of drive tests information and radio link failure information. The memory and the computer program code are further configured to, with the processor, cause the apparatus at least to associate the minimization of drive tests information and the radio link failure information with a user equipment context. The memory and the computer program code are further configured to, with the processor, cause the apparatus at least to correlate the minimization of drive tests information and the radio link failure information. The memory and the computer program code are further configured to, with the processor, cause the apparatus at least to store the minimization of drive tests information and the radio link failure information within a trace record according to the user equipment context. The memory and the computer program code are further configured to, with the processor, cause the apparatus at least to transmit the trace record to a collection entity.

According to another embodiment, an apparatus includes means for receiving a trace session activation request including a job type parameter indicating minimization of drive tests activation and radio link failure information collection. The apparatus further includes means for receiving minimization of drive tests information and radio link failure information. The apparatus further includes means for associating the minimization of drive tests information and the radio link failure information with a user equipment context. The apparatus further includes means for correlating the minimization of drive tests information and the radio link failure information. The apparatus further includes means for storing the minimization of drive tests information and the radio link failure information within a trace record according to the user equipment context. The apparatus further includes means for transmitting the trace record to a collection entity.

According to another embodiment, a computer-readable medium includes a computer program stored therein that, when executed by a processor, causes the processor to implement a method. The method includes receiving a trace session activation request including a job type parameter indicating minimization of drive tests activation and radio link failure information collection. The method further includes receiving minimization of drive tests information and radio link failure information. The method further includes associating the minimization of drive tests information and the radio link failure information with a user equipment context. The method further includes correlating the minimization of drive tests information and the radio link failure information. The method further includes storing the minimization of drive tests information and the radio link failure information within a trace record according to the user equipment context. The method further includes transmitting the trace record to a collection entity.

BRIEF DESCRIPTION OF THE DRAWINGS

Further embodiments, details, advantages, and modifications of the present invention will become apparent from the following detailed description of the preferred embodiments, which is to be taken in conjunction with the accompanying drawings, wherein.

DETAILED DESCRIPTION

Figure 1:
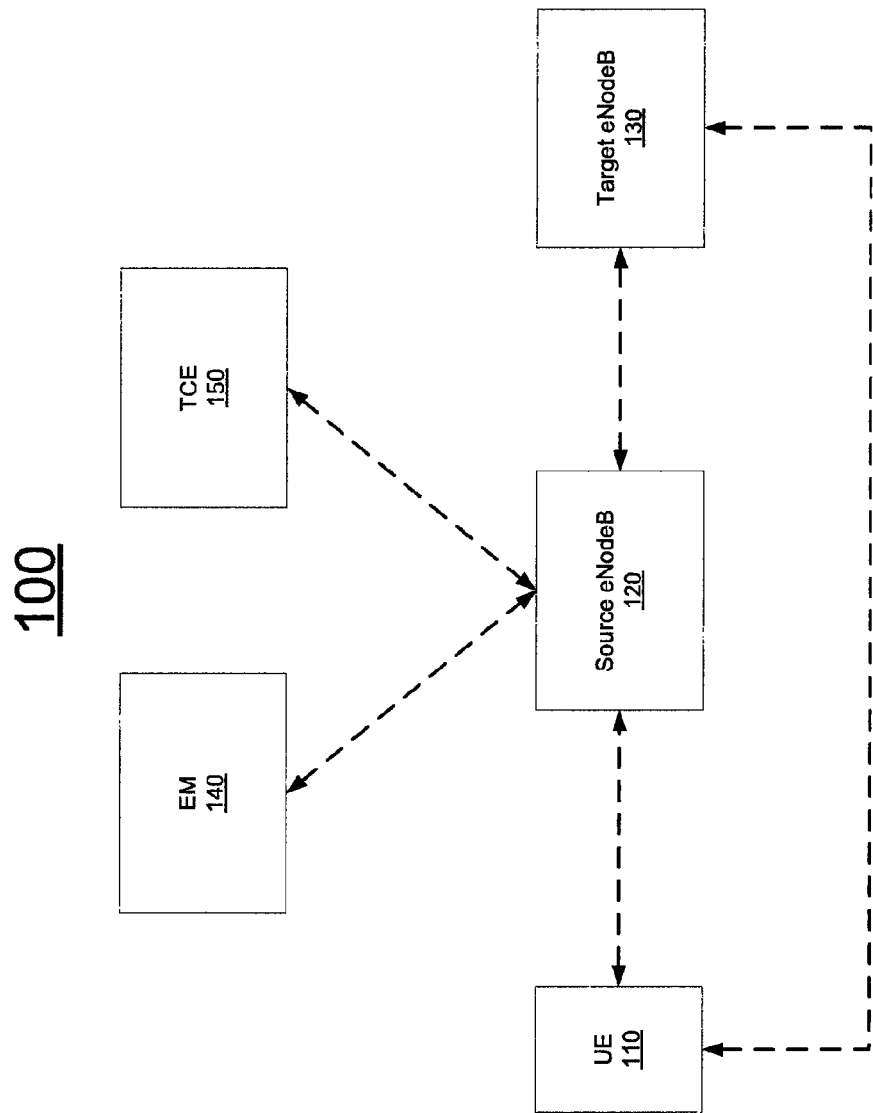
FIG. 1 illustrates a block diagram of a system, according to an embodiment of the invention.

It will be readily understood that the components of the present invention, as generally described and illustrated in the figures herein, may be arranged and designed in a wide variety of different configurations. Thus, the following detailed description of the embodiments of a method, apparatus, system, and computer-readable medium, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "an embodiment," "one embodiment," "another embodiment," "an alternative embodiment," "an alternate embodiment," "certain embodiments," "some embodiments," "other embodiments," "different embodiments" or other similar language, throughout this specification refers to the fact that a particular feature, structure, or characteristic described in connection with the embodiment may be included in at least one embodiment of the present invention. Thus, appearances of the phrases "an embodiment," "one embodiment," "another embodiment," "an alternative embodiment," "an alternate embodiment," "in certain embodiments," "in some embodiments," "in other embodiments," "in different embodiments," or other similar language, throughout this specification do not necessarily all refer to the same group of embodiments, and the described features, structures, or characteristics may be combined in any suitable manner in one or more embodiments.

As previously described, an RLF report can contain an explicit indication of the RLF by including one or more radio conditions. In addition, an RLF report can also include a location of a UE. MDT information can contain this information implicitly. Thus, it can often be important to correlate RLF information and MDT information that is received from a UE. However, correlation of MDT and RLF information on a per-UE basis is very challenging, if almost impossible, with no known feasible solutions.

One potential solution is to implement MDT-to-RLF correlation on a per-UE basis by combining MDT and RLF functionality into a single feature. More specifically, a combined MDT/RLF job type can be added for an area-based MDT activation, and the RLF functionality at an UE can be modified by adding Trace Session Reference (TR) and Trace Recording Session Reference (TRSR) configuration parameters, which are unique identifiers for MDT information. More specifically, when an evolved Node-B (eNodeB) receives an MDT activation with a TR parameter, the eNodeB can generate a TRSR parameter for each UE connection, and the TR and TRSR parameters can be configured to each UE during activation. In other words, each UE connection includes a TR parameter (which represents a trace session associated with the overall MDT functionality), and a TRSR parameter (which represents a trace recording session associated with the specific UE). When the UE detects a RLF, the UE can add the configured TR and TRSR parameters into an RLF report (in other words, RLF information). When the UE is able to connect to the network again, the RLF information can be transmitted, where the RLF information includes the TR and TRSR parameters. The MDT and RLF information can subsequently be correlated based on the TR and TRSR parameters.

However, this solution raises several problems. First, combining the MDT and RLF functionality into a single feature introduces unwanted interdependencies, because RLF functionality is generally mandatory functionality for a communication system while MDT functionality is generally optional functionality. Therefore, making RLF functionality dependent on MDT functionality would limit the availability of RLF collection. Second, MDT functionality is generally a subject of user consent validation. In other words, prior to the communication system collecting any MDT information, a user generally must consent to participate in the collection of MDT information. As a consequence, in a combined MDT/RLF feature, the RLF information could only be collected from UEs where the user has provided consent. This would limit the available RLF information, and make implementing RLF reporting more complex. These problems make it difficult to consider combining MDT and RLF functionality into a single feature as a feasible solution.

Thus, according to an embodiment of the invention, RLF functionality is performed within a trace functionality, as opposed to a MDT functionality. More specifically, a new trace job type is defined specifically for RLF information collection. As part of trace functionality associated with the new RLF trace job type, RLF information (in the format of one or more RLF reports) is collected from one or more UEs by a source eNodeB. In one embodiment, the source eNodeB can collect the one or more RLF reports directly from each UE. In an alternate embodiment, each UE transmits one or more RLF reports to a target eNodeB. The target eNodeB subsequently transmits the one or more RLF reports to the source eNodeB via an X2 interface. In one embodiment, the new trace job type can filter collected RLF information based on filtering parameters associated with RLF version type and RLF report content.

In certain embodiments where MDT to RLF correlation is needed, the MDT functionality can be activated as a combined MDT/trace job type where the trace job type is defined as an RLF collection job. The correlation of MDF and RLF information is performed using the following algorithm. MDT functionality is first activated as an area-based MDT/trace job with a TR parameter. For each new UE selected for MDT functionality, the eNodeB generates a new TRSR parameter that is stored in a user context structure. The MDT information that is received from a UE is stored in MDT records using the TR parameter and the TRSR parameter from the corresponding user context, with the context including, in one example, location information. If an RLF occurs, an RLF report is generated by the UE and transmitted to a source eNodeB. In an alternate embodiment, an RLF report is generated by the UE and transmitted to a target eNodeB. The target eNodeB subsequently forwards the RLF report over an X2 interface to the source eNodeB. The RLF report is then stored in a trace record with a corresponding TR parameter and TRSR parameter from the UE's user context. The correlation of MDT and RLF information can be performed either at a trace collection entity (TCE) or directly at the source eNodeB using a combination of the TR parameter and the TRSR parameter as a unique identifier. Further embodiment details are described below.

FIG. 1 illustrates a block diagram of a system 100, according to an embodiment of the invention. According to the embodiment, system 100 includes UE 110. UE 110 is a device that is utilized by a user to communicate over system 100, such as a hand-held telephone, smartphone, laptop computer, tablet computer, or personal digital assistant (PDA). UE 110 can establish a radio connection with an eNodeB (e.g., source eNodeB 120 or target eNodeB 130 as illustrated in FIG. 1) using a radio interface. As is described below in greater detail, upon receiving an indication from source eNodeB 120, UE 110 can perform MDT measurements and collect MDT information. UE 110 can subsequently transmit the collected MDT information to either source eNodeB 120 or target eNodeB 130. Likewise, as is also described below in greater detail, if an RLF occurs, UE 110 can detect the RLF and collect RLF information. UE 110 can subsequently transmit the collected RLF information to either source eNodeB 120 or target eNodeB 130.

System 100 also include source eNodeB 120. Source eNodeB 120 is a device operatively connected to system 100, and configured to establish a radio connection with a UE (e.g., UE 110 as illustrated in FIG. 1) using a radio interface. As is described below in greater detail, source eNodeB 120 can receive a trace session activation request and activate a trace session. As is also described below in greater detail, source eNodeB 120 can receive RLF information and/or MDT information from UE 110. In certain embodiments where source eNodeB 120 receives both RLF information and MDT information, source eNodeB 120 can correlate the RLF information and the MDT information.

System 100 also includes target eNodeB 130. Similar to source eNodeB 120, target eNodeB 130 is a device operatively connected to system 100, and configured to establish a radio connection with a UE (e.g., UE 110 as illustrated in FIG. 1) using a radio interface. Target eNodeB 130 is also configured to establish a radio connection with an eNodeB (e.g., source eNodeB 120 as illustrated in FIG. 1) using an X2 interface. As is described below in greater detail, target eNodeB 130 can receive RLF information from UE 110. Upon receiving RLF information, target eNodeB 130 can forward the RLF information to source eNodeB 120.

System 100 also includes element manager (EM) 140. An EM is a device operatively connected to system 100, and configured to manage one or more network elements within system 100. As is described below in greater detail, EM 140 can activate a trace session by transmitting a trace session activation request to source eNodeB 120.

System 100 also includes TCE 150. A TCE is a device operatively connected to system 100, and configured to receive one or more trace records. As is described below in greater detail, the one or more trace records can include RLF information and/or MDT information. In certain embodiments where the one or more trace records include both RLF information and MDT information, TCE 150 can correlate the RLF information and the MDT information.

One of ordinary skill in the art would readily appreciate that the configuration of system 100 illustrated in FIG. 1 is an example configuration, and that system 100 can be configured according to alternate configurations and still be within a scope of the invention.

Figure 2:
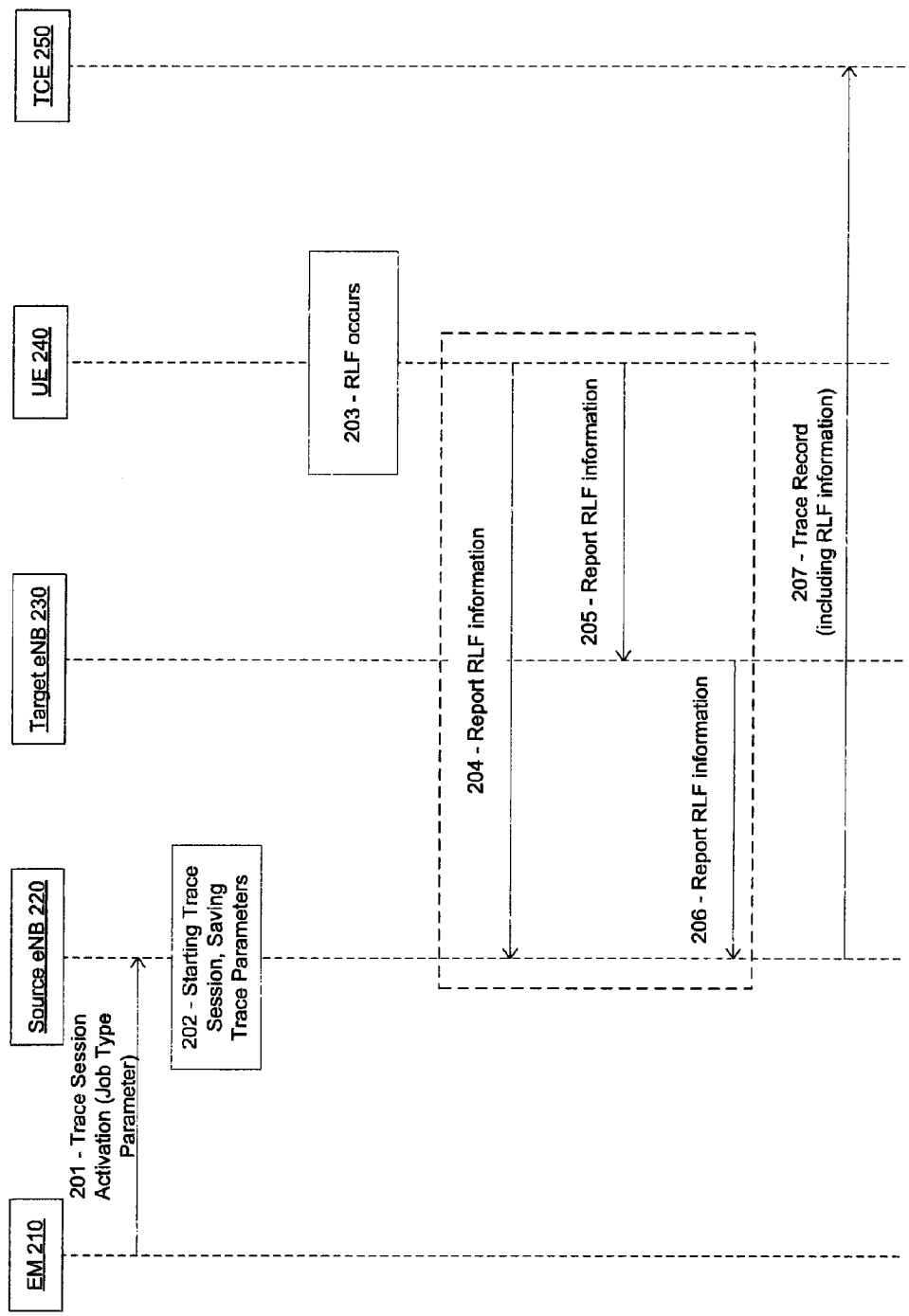
FIG. 2 illustrates a sequence diagram of RLF information collection within a trace functionality, according to an embodiment of the invention.

FIG. 2 illustrates a sequence diagram of RLF information collection within a trace functionality, according to an embodiment of the invention. The sequence diagram illustrated in FIG. 2 involves the following network elements: EM 210, source eNodeB 220, target eNodeB 230, UE 240, and TCE 250. In certain embodiments, EM 210 is identical to EM 140 of FIG. 1, source eNodeB 220 is identical to source eNodeB 120 of FIG. 1, target eNodeB 230 is identical to target eNodeB 130 of FIG. 1, UE 240 is identical to UE 110 of FIG. 1, and TCE 250 is identical to TCE 150 of FIG. 1.

According to the embodiment, at step 201, EM 210 transmits a trace session activation request to source eNodeB 220. A trace session is a time interval started with a trace session activation request and lasts until the deactivation of that specific trace session. A trace session can include one or more trace recording sessions. A trace recording session is a time interval within a trace session where one or more signaling messages transmitted by a network element, such as an eNodeB, or a UE, can be collected and transmitted to a network element, such as a TCE. In certain embodiments, the collected one or more signaling messages can be stored in a generated trace record, where a trace record includes collected traceable information as determined by trace control and configuration parameters. A trace recording session can be started by a first triggering event and can be stopped by a second triggering event. A trace session can include a trace reference parameter (also identified as a trace session reference parameter or a TR parameter) that identifies the trace session and is globally unique. A trace recording session can include a trace recording session reference parameter (also identified as a TRSR parameter) that identifies the trace recording session within a trace session.

A trace session can be activated/deactivated in different network elements directly from EM 210 using the management interfaces of those network elements. This is identified as management activation/deactivation. A trace session can also be activated/deactivated in different network elements using the signaling interfaces between those elements so that the network elements may forward the activation/deactivation request that originates from EM 210. This is identified as signaling based activation/deactivation.

The trace session activation request transmitted by EM 210 can include one or more trace control and configuration parameters. The one or more trace control and configuration parameters can include one or more of the following parameters: a triggering event parameter, a trace depth parameter, an interface parameter, a TR parameter, a TRSR parameter, a TCE Internet Protocol (IP) address parameter, a job type parameter, an area scope parameter, a measurement parameter, a reporting trigger parameter, a report interval parameter, a report amount parameter, a reference signal received power (RSRP) event threshold parameter, a reference signal received quality (RSRQ) event threshold parameter, a logging interval parameter, a logging duration parameter, or a trace collection entity identity parameter.

A triggering event parameter defines when to start a trace recording session, which message is to be recorded first, when to stop a trace recording session, and which message is to be recorded last. A trace depth parameter defines how detailed information should be recorded in a network element. An interface parameter defines one or more interfaces to be recorded in the network element. A TR parameter, as previously described, identifies a trace session and is globally unique. A TRSR parameter, as previously described, identifies a trace recording session within the trace session. A TCE IP address parameter defines an IP address of an TCE to which one or more trace records are transferred.

A job type parameter defines whether a combined MDT and trace job is indicated. The job type parameter also defines an MDT mode, if MDT functionality is indicated. As is described below in greater detail, according to an embodiment of the invention, a job type parameter also defines whether an RLF reporting job is indicated, and also defines whether a combined MDT and trace job with RLF reporting is indicated. In one embodiment, the job type parameter is an enumerated type with the following possible values: "Immediate MDT only," "Logged MDT only," "Trace only,"

"Immediate MDT and Trace," RLF reporting only, " and "Immediate MDT and Trace for RLF report collection." However, this is merely an example embodiment, and in alternate embodiments, the job type parameter may include a different enumerated value. Further details of the job type parameter are discussed below.

An area scope parameter defines an area (either in terms of cells or a tracking area/routing area/location area) where MDT information collection is to take place. A measurement parameter defines measurements that are collected when a job type is configured for immediate MDT. A reporting trigger parameter defines one or triggers that initiate reporting. A report interval parameter indicates an interval between any periodical measurements. A report amount parameter defines a number of measurement reports that are taken for periodical reporting. A reference signal received power (RSRP) event threshold parameter defines a threshold for recording an RSRP event. A reference signal received quality (RSRQ) event threshold parameter defines a threshold for recording an RSRQ event. A logging interval parameter defines a periodicity for logging MDT measurements. A logging duration parameter defines a duration for logging MDT measurements. A TCE identity parameter defines an identity of a TCE.

According to the embodiment, the trace session activation request includes a job type parameter, where the job type parameter includes a new trace job type defined specifically for RLF information collection. In the illustrated embodiment in FIG. 2, the job type parameter includes a value of "RLF reporting only." Thus, the job type parameter included within the trace session activation request indicates that RLF information is to be collected during a trace session. However, this is merely an example embodiment, and in alternate embodiments, the job type parameter may include a different value that indicates that RLF information is to be collected during a trace session.

In certain embodiments where the job type parameter includes a value of "RLF reporting only," the trace session activation request transmitted by EM 210 also includes an RLF filtering parameter. An RLF filtering parameter allows an eNodeB (such as source eNodeB 220) to filter received RLF reports, and to discard received RLF reports based on a criteria. The criteria can be based on an RLF report version type and RLF report content. For example, the eNodeB can keep track of RLF report content received for an RLF report version type. In one example, if the eNodeB receives an RLF report that includes RLF report content associated with an RLF report version type, and the eNodeB determines that it has previously received RLF report content associated with that RLF report version type, the eNodeB can disregard the newly received RLF report. In another example, a pre-set threshold can be associated with an RLF report version type. Thus, when the eNodeB receives an RLF report that includes RLF report content associated with the RLF report version type, the eNodeB can determine if the amount of RLF report content (plus the amount of any previously-received RLF report content) exceeds the pre-set threshold. If the received amount of RLF report content (plus the amount of any previously received RLF report content) does exceed the pre-set threshold, then the eNodeB can disregard the newly received RLF report.

At step 202, source eNodeB 220 starts a trace session. According to the embodiment, source eNodeB 220 also saves the one or more trace control and configuration parameters (including a job type parameter associated with a value of "RLF reporting only"). In one embodiment, the one or more trace control configuration parameters saved by source eNodeB 220 also include a RLF filtering parameter. As previously described, source eNodeB 220 can filter RLF information that is received by one or more UEs (such as UE 240) based on the RLF filtering parameter.

At step 203, an RLF occurs. According to the embodiment, while UE 240 is a connected mode, UE 240 detects the RLF. UE 240 then enters a recovery phase and UE 240 starts to search for a recovery eNodeB. A recovery eNodeB can either be source eNodeB 220 or target eNodeB 230. Once UE 240 has found a recovery eNodeB, UE 240 initiates a radio resource control reestablishment procedure. If the radio resource control reestablishment procedure is successful, UE 240 can reestablish a connection with either source eNodeB 220 or target eNodeB 230. If the radio resource control reestablishment procedure is unsuccessful, UE 240 can go into an idle mode until it establishes a new connection with either source eNodeB 220 or target eNodeB 230.

Subsequently, some (but not all) of steps 204, 205, and 206 are performed. This is illustrated in FIG. 2, where steps 204, 205, and 206 are surrounded by a dashed line. According to the embodiment, if UE 240 reestablishes (or establishes) a connection with source eNodeB 220, step 204 is performed, and steps 205 and 206 are not performed. However, if UE 240 reestablishes (or establishes) a connection with target eNodeB 230, steps 205 and 206 are performed, and step 204 is not performed.

At step 204, UE 240 generates a RLF report and transmits the RLF report to source eNodeB 220. According to the embodiment, UE 240 stores one or more radio conditions that UE 240 recorded at the time of the RLF within the RLF report, and UE 240 also stores a location of UE 240 at the time of the RLF.

At step 205, UE 240 generates a RLF report and transmits the RLF report to target eNodeB 230. According to the embodiment, UE 240 can store RLF information within the RLF report similar to the RLF information previously described in relation to step 204. At step 206, target eNodeB 230 forwards the RLF report to source eNodeB 220. Target eNodeB 230 can forward the RLF report by receiving the RLF report from UE 240 and retransmitting the RLF report to source eNodeB 220 over an X2 interface. Source eNodeB 220 can then associate the RLF report with a user equipment context that is identical to a user equipment context of UE 240. In certain embodiments, whether source eNodeB 220 receives the RLF report from UE 240 or target eNodeB 230, source eNodeB 220 can filter the RLF report based on content of the RLF report and a version type of the RLF report as previously described.

At step 207, source eNodeB 220 creates a trace record, and transmits the trace record to TCE 250. According to the embodiment, the trace record includes the trace session information collected from UE 240 by source eNodeB 220. The trace record also includes the RLF information contained in the RLF report received by source eNodeB 220, where the RLF information includes RLF information collected from UE 240. The RLF report can be stored within the trace record with a corresponding TR parameter and a corresponding TRSR parameter.

Figure 3:
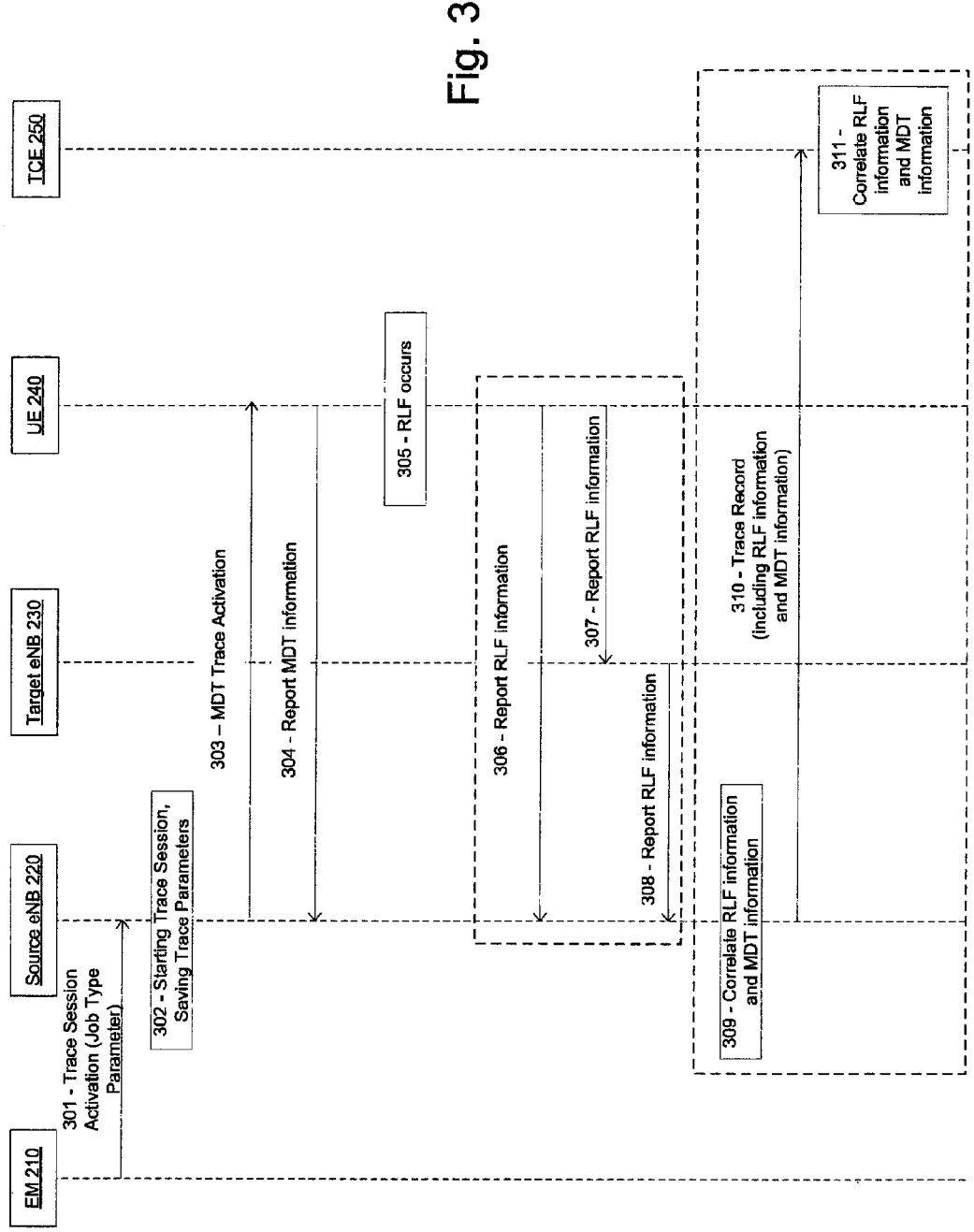
FIG. 3 illustrates a sequence diagram of RLF information and MDT information collection within a trace functionality, according to an embodiment of the invention.

FIG. 3 illustrates a sequence diagram of RLF information and MDT information collection within a trace functionality, according to another embodiment of the invention. The sequence diagram illustrated in FIG. 3 involves the following network elements: EM 210, source eNodeB 220, target eNodeB 230, UE 240, and TCE 250.

According to the embodiment, at step 301, EM 210 transmits a trace session activation request to source eNodeB 220. A trace session is previously described in relation to FIG. 2. The trace session activation request transmitted by EM 210 can include one or more trace control and configuration parameters. Trace control and configuration parameters are previously described in relation to FIG. 2.

According to the embodiment, the trace session activation request includes a job type parameter, where the job type parameter includes a new trace job type defined specifically for a combined MDT/trace job where the trace job is defined as an RLF collection job. In the illustrated embodiment in FIG. 3, the job type parameter includes a value of an enumerated type, "Immediate MDT and Trace for RLF report collection." Thus, the job type parameter included within the trace session activation request indicates that RLF information is to be collected during a combined MDT/trace session. However, this is merely an example embodiment, and in alternate embodiments, the job type parameter may include a different enumerated value that indicates that RLF information is to be collected during a combined MDT/trace session.

In certain embodiments where the job type parameter includes a value of "Immediate MDT and Trace for RLF report collection," the trace session activation request transmitted by EM 210 also includes an RLF filtering parameter. An RLF filtering parameter is previously described in relation to FIG. 2.

At step 302, source eNodeB 220 starts a trace session. According to the embodiment, source eNodeB 220 also saves the one or more trace control and configuration parameters (including a job type parameter associated with a value of "Immediate MDT and Trace for RLF report collection"). In one embodiment, source eNodeB 220 also stores a RLF filtering parameter. As previously described, source eNodeB 220 can filter RLF information that is received by one or more UEs (such as UE 240) based on the RLF filtering parameter. Furthermore, according to the embodiment, source eNodeB 220 also selects one or more UEs (such as UE 240) to perform trace functionality, MDT information collection, and RLF information collection.

At step 303, source eNodeB 220 transmits a MDT trace activation message to UE 240. The trace activation message causes UE 240 to activate trace functionality. According to the embodiment, the trace activation message can include some (or all) of the trace control and configuration parameters. The trace control and configuration parameters can be used to configure one or more measurements performed by UE 240 that are associated with MDT. In the illustrated embodiment of FIG. 3, the trace activation message includes a job type parameter associated with a value of "Immediate MDT and Trace for RLF report collection." Thus, the trace activation message also causes UE 240 to activate MDT functionality and RLF reporting functionality. In one embodiment, the trace activation message also includes a RLF filtering parameter.

According to the embodiment, UE 240 subsequently generates MDT information. UE 240 generates MDT information by performing one or more MDT measurements. There are two modes for MDT measurements, Logged MDT and Immediate MDT. Logged MDT is MDT functionality involving measurement logging by UE 240 in IDLE mode, and in CELL_PCH and URA_PCH states, where UE 240 reports the MDT measurements to an eNodeB (such as source eNodeB 220). Immediate MDT is MDT functionality involving measurements performed by UE 240 in a CONNECTED state, and involves reporting the measurements to an eNodeB (such as source eNodeB 220) at the time the measurements are performed. In an embodiment where UE 240 performs MDT measurements in an Immediate MDT mode, upon receiving the trace activation message from source eNodeB 220, UE 240 initiates a MDT measurement collection task and generates MDT information. The generation of MDT information can include performing measurements of one or more attributes by UE 240, and the MDT information can include the measurements of the one or more attributes. For example, the generation of MDT information can include performing RSRP and RSRQ measurements, as well as a power headroom (PH) measurement, and the MDT information can include the measurements of RSPR, RSRQ, and PH. As another example, the generation of MDT information can include determining detailed location information of UE 240, and the MDT information can include the detailed location information.

At step 304, UE 240 transmits the MDT information to source eNodeB 220. A TR parameter and a TRSR parameter can be used at source eNodeB 220 to associate the MDT information with a specific trace session, and a specific trace recording session. Source eNodeB 220 can also associate the MDT information with a user equipment context that is identical to a user equipment context of UE 240. In certain embodiments, the MDT information is stored within a MDT record.

At step 305, an RLF occurs. According to the embodiment, while UE 240 is a connected mode, UE 240 detects the RLF. UE 240 then enters a recover phase as previously described in relation to FIG. 2. Subsequently, some (but not all) of steps 306, 307, and 308 are performed. This is illustrated in FIG. 3, where steps 306, 307, and 308 are surrounded by a dashed line. As also previously described, UE 240 can either reestablish a connection, or establish a new connection, with either source eNodeB 220 or target eNodeB 230. According to the embodiment, if UE 240 reestablishes (or establishes) a connection with source eNodeB 220, step 306 is performed, and steps 307 and 308 are not performed. However, if UE 240 reestablishes (or establishes) a connection with target eNodeB 230, steps 307 and 308 are performed, and step 306 is not performed.

At step 306, UE 240 generates a RLF report and transmits the RLF report to source eNodeB 220. According to the embodiment, UE 240 stores one or more radio conditions that UE 240 recorded at the time of the RLF within the RLF report, and UE 240 also stores a location of UE 240 at the time of the RLF. As previously described, a TR parameter and a TRSR parameter can be used at source eNodeB 220 to associate the RLF report with a specific trace session, and a specific trace recording session. In one embodiment, UE 240 also associates content of the RLF report with an RLF report version type.

At step 307, UE 240 generates a RLF report and transmits the RLF report to target eNodeB 230. According to the embodiment, UE 240 can store RLF information within the RLF report similar to the RLF information previously described in relation to step 308. At step 308, target eNodeB 230 forwards the RLF report to source eNodeB 220. Target eNodeB 230 can forward the RLF report by receiving the RLF report from UE 240 and retransmitting the RLF report to source eNodeB 220 over an X2 interface. Source eNodeB 220 can then associate the RLF report with a user equipment context that is identical to a user equipment context of UE 240. In certain embodiments, whether source eNodeB 220 receives the RLF report from UE 240 or target eNodeB 230, source eNodeB 220 can filter the RLF report based on content of the RLF report and a version type of the RLF report as previously described.

Subsequently, some (but not all) of steps 309, 310, and 311 are performed. This is illustrated in FIG. 3, where steps 309, 310, and 311 are surrounded by a dashed line. In one embodiment, correlation of RLF and MDT information is performed at source eNodeB 220, and is performed before a trace record is created. In this embodiment, steps 309 and 310 are performed, and step 311 is not performed. In an alternate embodiment, correlation of RLF and MDT information is performed at TCE 250, and is performed after a trace record is created. In this embodiment, steps 310 and 311 are performed, and step 309 is not performed.

At step 309, source eNodeB 220 correlates the RLF information and MDT information received from UE 240. More specifically, in one embodiment, source eNodeB 220 identifies a RLF report associated with a TR parameter and a TRSR parameter. Source eNodeB 220 further identifies a MDT record associated with the same TR parameter and the same TRSR parameter. Source eNodeB 220 correlates the RLF report with the MDT record based on the TR parameter and the TRSR parameter. In an alternate embodiment, source eNodeB 220 identifies a RLF report associated with a user equipment context. Source eNodeB 220 further identifies a MDT record associated with the same user equipment context. In either embodiment, source eNodeB 220 performs this correlation for each RLF report of the RLF information and for each MDT record of the MDT information.

At step 310, source eNodeB 220 creates a trace record, and transmits the trace record to TCE 250. According to the embodiment, the trace record includes the trace session information collected from UE 240 by source eNodeB 220. The trace record also includes the RLF information contained in the RLF report received by source eNodeB 220, where the RLF information includes RLF information collected from UE 240. The RLF report can be stored within the trace record with a corresponding TR parameter and a corresponding TRSR parameter. The trace record further includes the MDT information collected from UE 240. The MDT information can be stored within the trace record with a corresponding TR parameter and a corresponding TRSR parameter. In one embodiment, the MDT information is stored as an MDT record.

At step 311, TCE 250 correlates the RLF information and MDT information stored within a trace record, or multiple trace records, received from source eNodeB 220. More specifically, TCE 250 identifies a RLF report associated with a TR parameter and a TRSR parameter. TCE 250 further identifies a MDT record associated with the same TR parameter and the same TRSR parameter. TCE 250 correlates the RLF report with the MDT record based on the TR parameter and the TRSR parameter. Source eNodeB 220 performs this correlation for each RLF report of the RLF information and for each MDT record of the MDT information.

Figure 4:
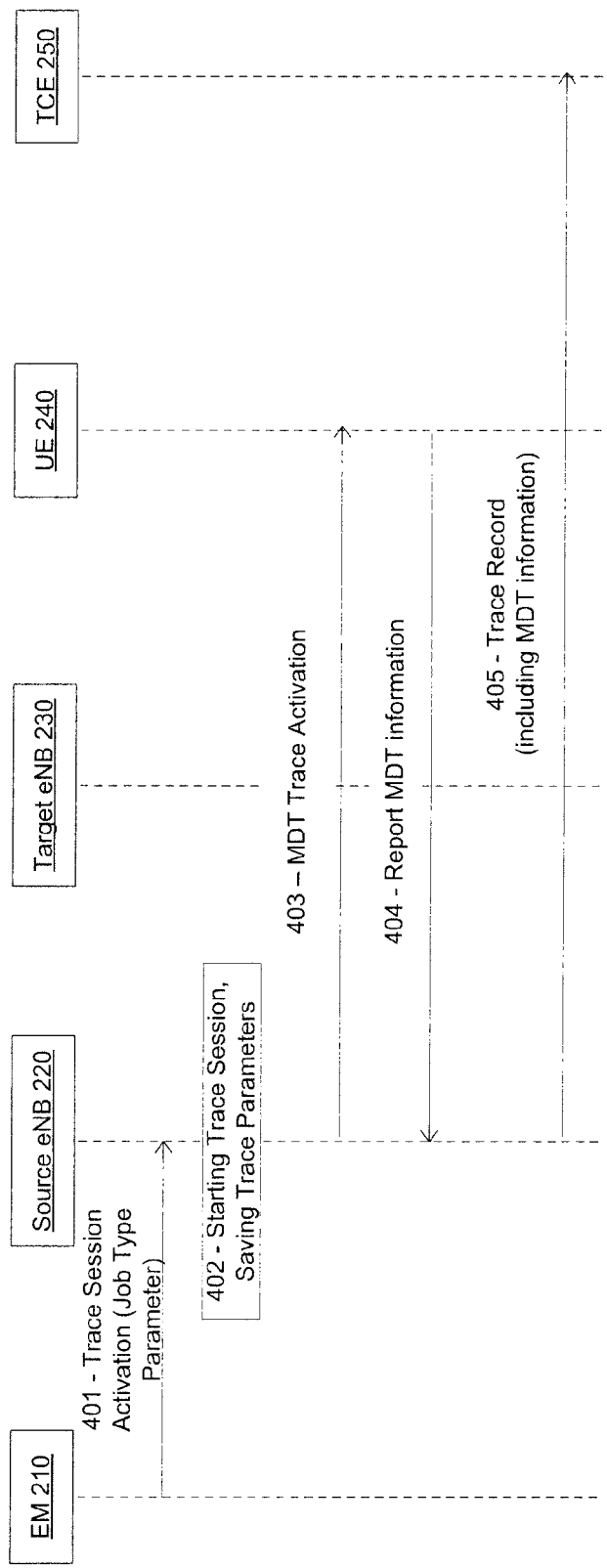
FIG. 4 illustrates a sequence diagram of MDT information collection within a trace functionality, according to an embodiment of the invention.

FIG. 4 illustrates a sequence diagram of MDT information collection within a trace functionality, according to another embodiment of the invention. The sequence diagram illustrated in FIG. 4 involves the following network elements: EM 210, source eNodeB 220, target eNodeB 230, UE 240, and TCE 250.

According to the embodiment, at step 401, EM 210 transmits a trace session activation request to source eNodeB 220. A trace session is previously described in relation to FIG. 2. The trace session activation request transmitted by EM 210 can include one or more trace control and configuration parameters. Trace control and configuration parameters are previously described in relation to FIG. 2.

According to the embodiment, the trace session activation request includes a job type parameter, where the job type parameter includes a trace job for a combined MDT/trace job. In the illustrated embodiment in FIG. 3, the job type parameter includes a value of an enumerated type, "Immediate MDT and Trace." Thus, the job type parameter included within the trace session activation request indicates that a combined MDT/trace session is to be activated. However, this is merely an example embodiment, and in alternate embodiments, the job type parameter may include a different enumerated value that indicates that a combined MDT/trace session is to be activated.

At step 402, source eNodeB 220 starts a trace session. According to the embodiment, source eNodeB 220 also saves the one or more trace control and configuration parameters (including a job type parameter associated with a value of "Immediate MDT and Trace"). Furthermore, according to the embodiment, source eNodeB 220 also selects one or more UEs (such as UE 240) to perform trace functionality and MDT information collection.

At step 403, source eNodeB 220 transmits a MDT trace activation message to UE 240. The trace activation message causes UE 240 to activate trace functionality. According to the embodiment, the trace activation message can include some (or all) of the trace control and configuration parameters. The trace control and configuration parameters can be used to configure one or more measurements performed by UE 240 that are associated with MDT. In the illustrated embodiment of FIG. 3, the trace activation message includes a job type parameter associated with a value of "Immediate MDT and Trace." Thus, the trace activation message also causes UE 240 to activate MDT functionality.

At step 404, UE 240 transmits the MDT information to source eNodeB 220. A TR parameter and a TRSR parameter can be used at source eNodeB 220 to associate the MDT information with a specific trace session, and a specific trace recording session. Source eNodeB 220 can also associate the MDT information with a user equipment context that is identical to a user equipment context of UE 240. In certain embodiments, the MDT information is stored within a MDT record.

At step 405, source eNodeB 220 creates a trace record, and transmits the trace record to TCE 250. According to the embodiment, the trace record includes the trace session information collected from UE 240 by source eNodeB 220. The trace record also includes the MDT information collected from UE 240. The MDT information can be stored within the trace record with a corresponding TR parameter and a corresponding TRSR parameter. In one embodiment, the MDT information is stored as an MDT record.

Figure 5:
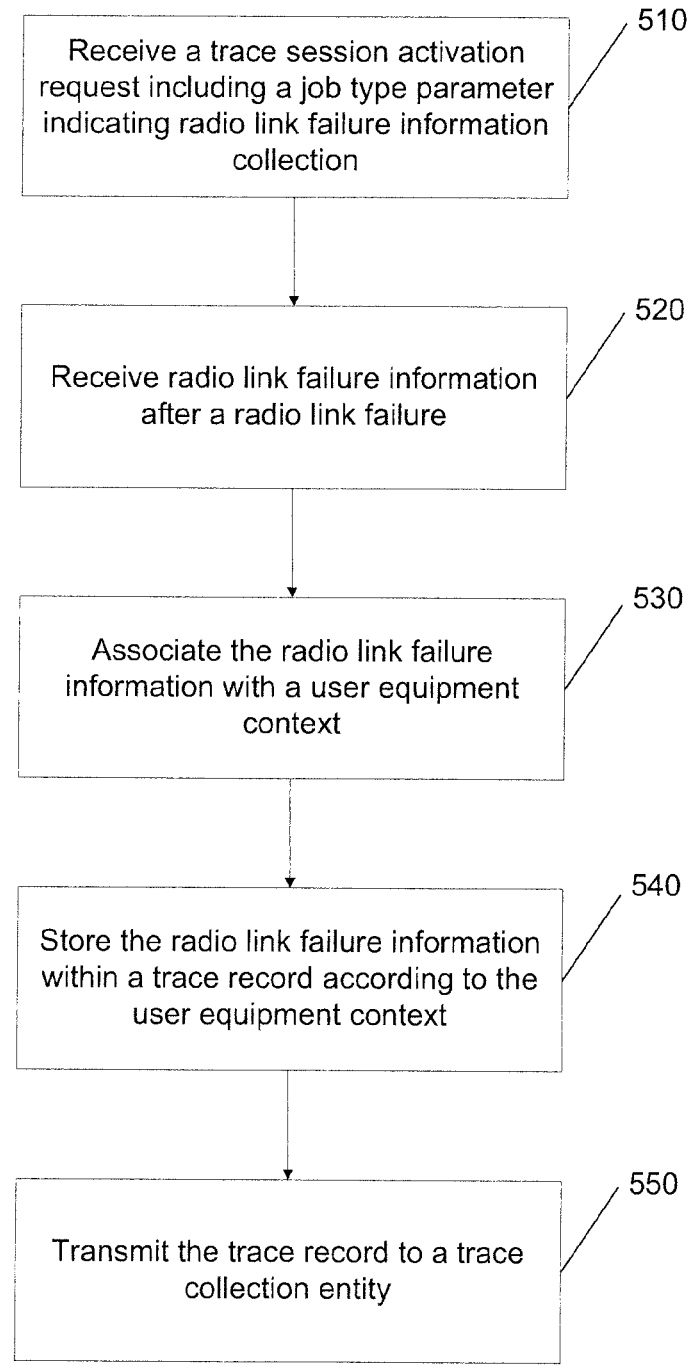
FIG. 5 illustrates a method, according to an embodiment of the invention.

FIG. 5 illustrates a method according to an embodiment of the invention. The steps of a method or algorithm described in connection with the embodiments disclosed herein may be embodied directly in hardware, in a computer program executed by a processor, or in a combination of the two. A computer program may be embodied on a computer-readable medium, such as a storage medium. For example, a computer program may reside in RAM, flash memory, ROM, EPROM, EEPROM, registers, hard disk, a removable disk, a CD-ROM, or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components. Furthermore, a computer-readable medium may be any type of tangible medium.

At step 510, a trace session activation request is received, where the trace session activation request includes a job type parameter indicating radio link failure information collection. At step 520, radio link failure information is received, where the radio link failure information is received after a radio link failure. At step 530, the radio link failure information is associated with a user equipment context. At step 540, the radio link failure information is stored within a trace record according to the user equipment context. At step 550, the trace record is transmitted to a trace collection entity. In certain embodiments, steps 510, 520, 530, 540, and 550 are performed at an eNodeB.

In certain embodiments, the method illustrated in FIG. 5 includes additional steps. More specifically, a trace session activation request is received including a job type parameter indicating minimization of drive tests activation. A minimization of drive tests measurements is activated at a user equipment. Minimization of drive tests information is subsequently received from the user equipment. The minimization of drive tests information is associated with a user equipment context. The minimization of drive tests information is then stored within a trace record according to the user equipment context. The trace record is then transmitted to a collection entity.

In certain embodiments, the radio link failure information and the minimization of drive tests information are correlated. In some embodiments, the radio link information and the minimization of drive tests information are correlated according to the user equipment context. In other embodiments, the radio link information and the minimization of drive tests information are correlated according to a TR parameter and a TRSR parameter.

In certain embodiments, the method illustrated in FIG. 5 further includes filtering the received radio link failure information based on a radio link failure filtering parameter, where the trace session activation request further comprises the radio link failure filtering parameter. In some embodiments, the radio link failure information is received from a user equipment. In other embodiments, the radio link failure information is received from an eNodeB.

Figure 6:
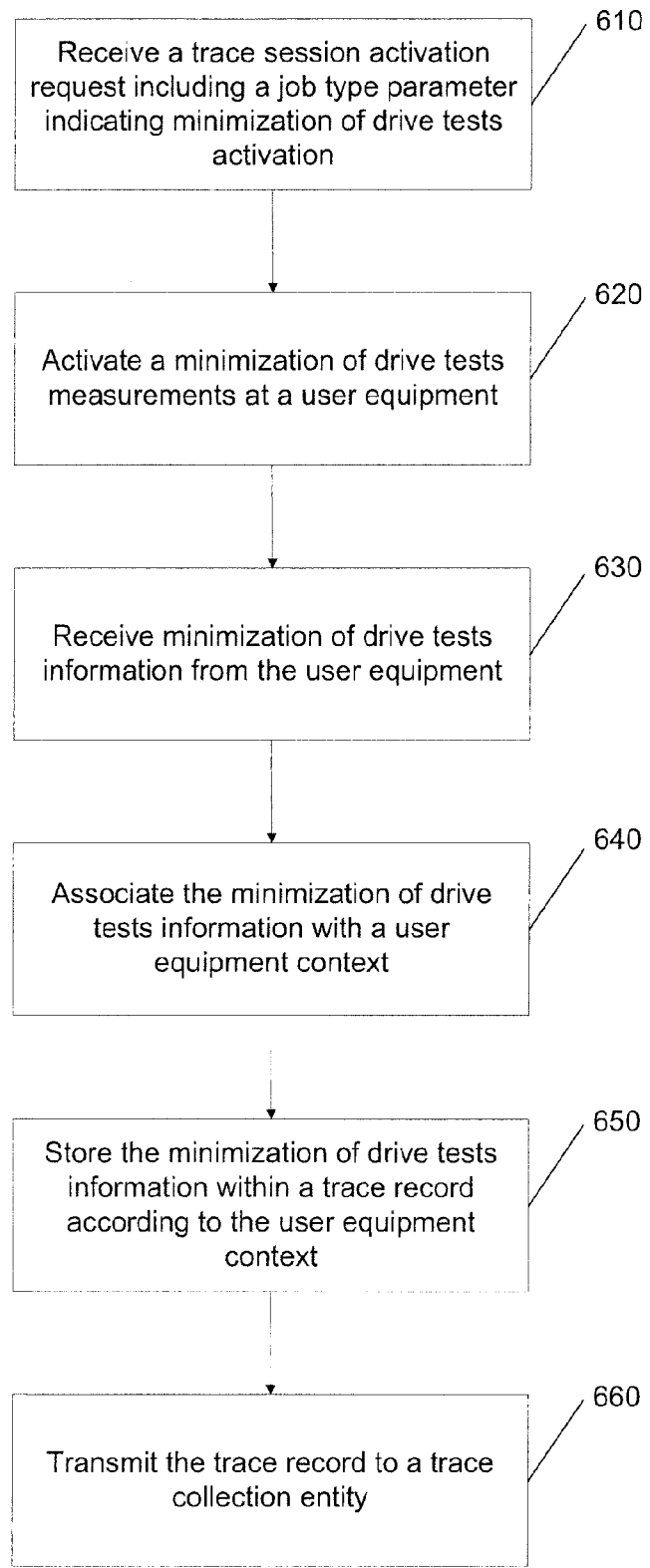
FIG. 6 illustrates a method, according to another embodiment of the invention.

FIG. 6 illustrates a method, according to another embodiment of the invention. At step 610, a trace session activation request is received including a job type parameter indicating minimization of drive tests activation. At step 620, a minimization of drive tests measurements is activated at a user equipment. At step 630, minimization of drive tests information is received from the user equipment. At step 640, the minimization of drive tests information is associated with a user equipment context. At step 650, the minimization of drive tests information is stored within a trace record according to the user equipment context. At step 660, the trace record is transmitted to a collection entity. In certain embodiments, steps 610, 620, 630, 640, 650, and 660 are performed at an eNodeB.

In certain embodiments, the method illustrated in FIG. 6 includes additional steps. More specifically, a trace session activation request is received, where the trace session activation request includes a job type parameter indicating radio link failure information collection. Subsequently, radio link failure information is received, where the radio link failure information is received after a radio link failure. The radio link failure information is associated with a user equipment context. The radio link failure information is then stored within a trace record according to the user equipment context. The trace record is subsequently transmitted to a trace collection entity.

In certain embodiments, the radio link failure information and the minimization of drive tests information are correlated. In some embodiments, the radio link information and the minimization of drive tests information are correlated according to the user equipment context. In other embodiments, the radio link information and the minimization of drive tests information are correlated according to a TR parameter and a TRSR parameter.

In certain embodiments, the method illustrated in FIG. 6 further includes filtering the received radio link failure information based on a radio link failure filtering parameter, where the trace session activation request further comprises the radio link failure filtering parameter. In some embodiments, the radio link failure information is received from a user equipment. In other embodiments, the radio link failure information is received from an eNodeB.

Figure 7:
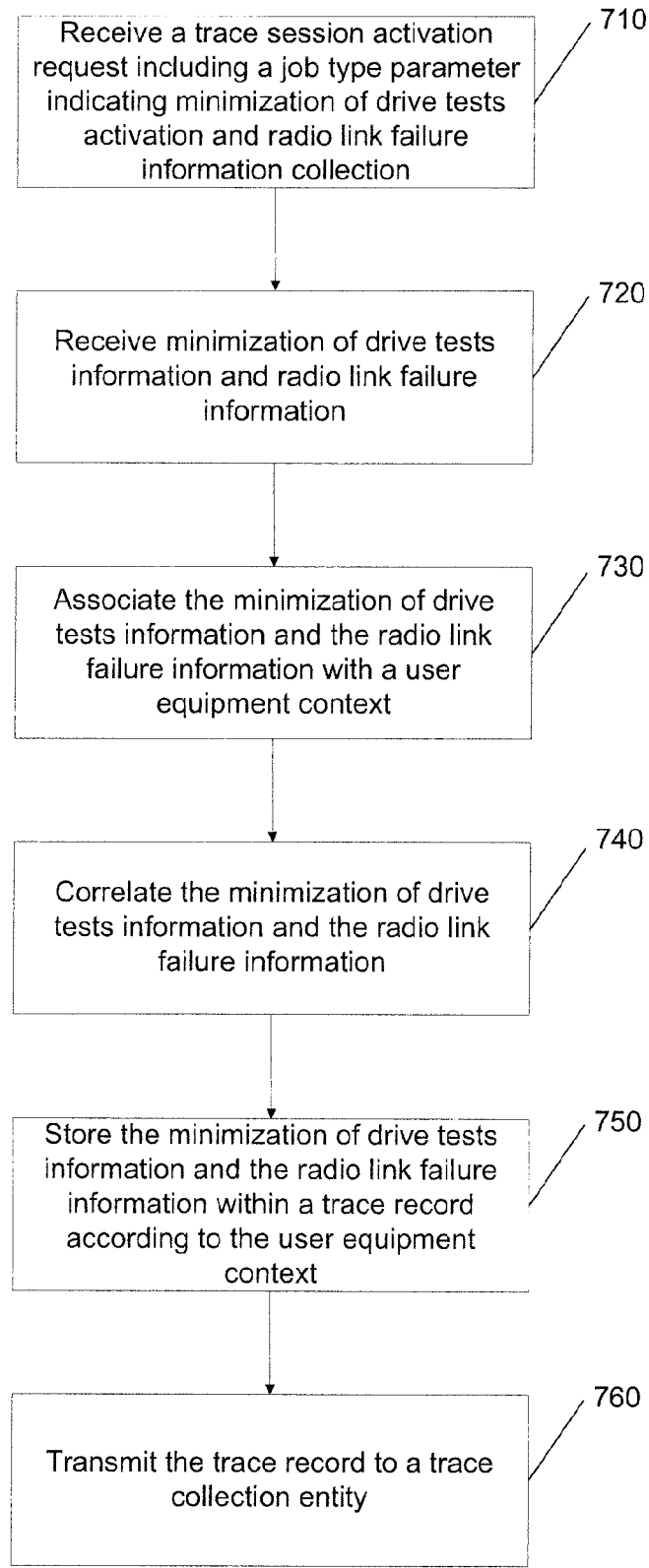
FIG. 7 illustrates a method, according to another embodiment of the invention.

FIG. 7 illustrates a method, according to another embodiment of the invention. At 710, a trace session activation request is received including a job type parameter indicating minimization of drive tests activation and radio link failure information collection. At 720, minimization of drive tests information and radio link failure information is received. At 730, the minimization of drive tests information and the radio link failure information is associated with a user equipment context. At 740, the minimization of drive tests information and the radio link failure information is correlated. At 750, the minimization of drive tests information and the radio link failure information is stored within a trace record according to the user equipment context. At 760, the trace record is transmitted to a collection entity.

Figure 8:
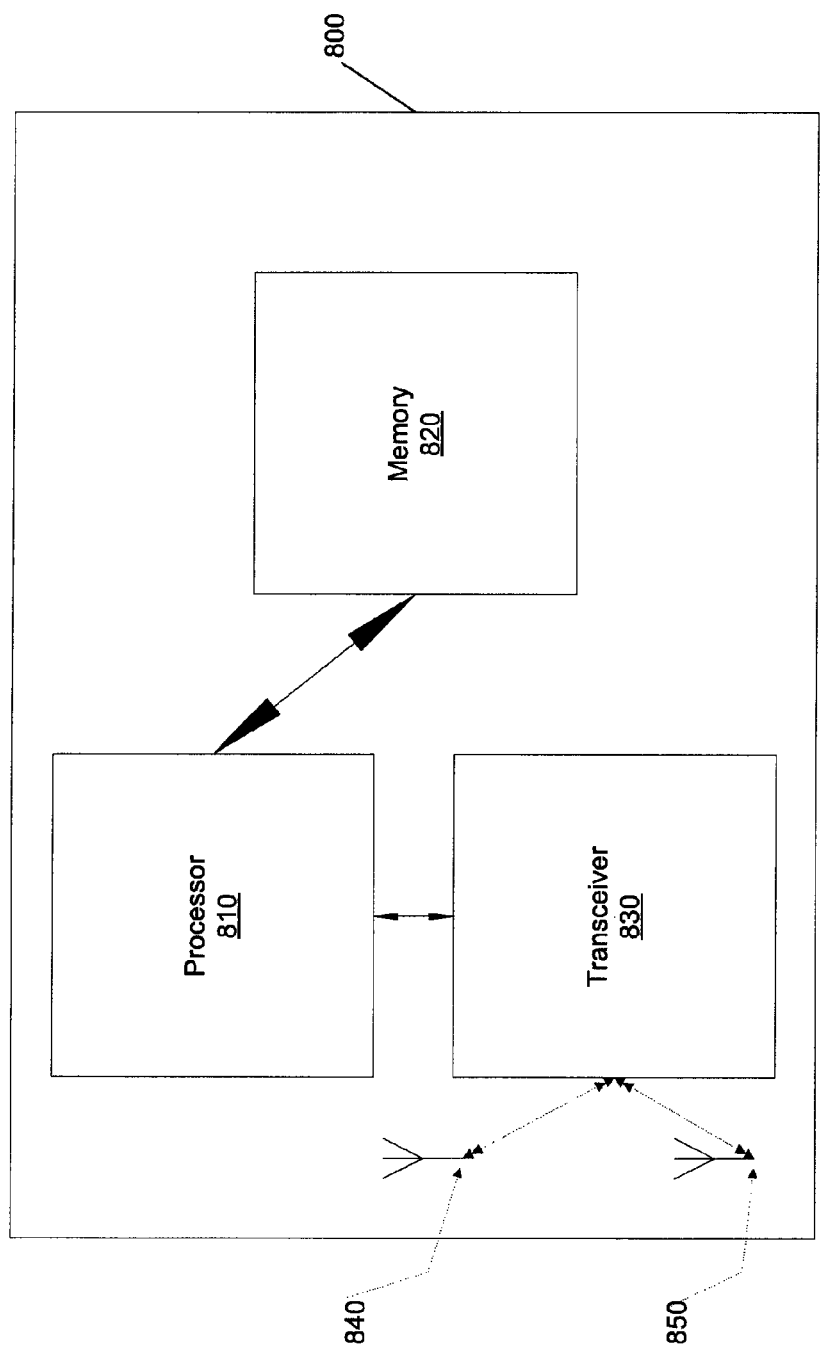
FIG. 8 illustrates an apparatus, according to an embodiment of the invention.

FIG. 8 illustrates an apparatus according to an embodiment of the invention. Apparatus 800 can include a processor 810 and a memory 820. Processor 810 is connected to memory 820, and can read information from, and write information to, memory 820. Processor 810 can be a front end processor, a back end processor, a microprocessor, a digital signal processor, a processor with an accompanying digital signal processor, a special-purpose computer chip, a field-programmable gate array (FPGA), a controller, an ASIC, or a computer. Memory 820 can be RAM, flash memory, ROM, EPROM, EEPROM, registers, hard disk, a removable disk, a CD-ROM, or any other form of storage medium known in the art. Memory 820 can include computer program code. As one of ordinary skill in the art would readily appreciate, apparatus 800 can include any number of processors in alternative embodiments. Likewise, apparatus 800 can include any number of memories in alternative embodiments.

Apparatus 800 can also include a transceiver 830, which is configured to transmit and receive a message, and which is connected to processor 810. Apparatus 800 can also include antennas 840 and 850, where each antenna is configured to assist transceiver 830 in the transmitting and receiving of a message. While the illustrated embodiment in FIG. 8 depicts two antennas, one of ordinary skill in the art would readily appreciate that apparatus 800 can include any number of antennas in alternative embodiments. In an alternative embodiment, apparatus 800 can include a single antenna.

In one embodiment, memory 820 and the computer program code can, with processor 810, cause apparatus 800 to implement the method previously described in relation to, and illustrated in, FIG. 5. In another embodiment, memory 820 and the computer program code can, with processor 810, cause apparatus 800 to implement the method previously described in relation to, and illustrated in, FIG. 6. In another embodiment, memory 820 and the computer program code can, with processor 810, cause apparatus 800 to implement the method previously described in relation to, and illustrated in, FIG. 8. In certain embodiments, apparatus 500 comprises an eNodeB.

According to certain embodiments of the invention, MDT and RLF information can be correlated on a per-UE basis without coupling MDT and RLF functionality, thus, ensuring that availability of centrally collected RLF reports is not limited based on MDT feature availability. Furthermore, no configuration parameters, such as TR and TRSR parameters, need to be sent to the UE to permit the per-UE correlation. Finally, MDT and RLF information can be correlated at a central server, such as a TCE, or at an eNodeB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
receiving, at a network element in a radio resource control connected mode, a trace session activation request including a job type parameter indicating minimization of drive tests activation;
causing an activation of a minimization of drive tests measurements at a user equipment;
receiving minimization of drive tests information from the user equipment;
associating the minimization of drive tests information with a user equipment context;
storing the minimization of drive tests information within a trace record according to the user equipment context;
transmitting the trace record to a collection entity;
receiving, at the network element in a radio resource control connected mode, a trace session activation request including a job type parameter indicating radio link failure information collection;
receiving radio link failure information after a radio link failure;
associating the radio link failure information with the user equipment context;
storing the radio link failure information within a trace record;
transmitting the trace record to a trace collection entity; and
correlating the radio link failure information and the minimization of drive tests information,
wherein the correlating the radio link failure information and the minimization of drive tests information comprises identifying trace records associated with the same user equipment context and correlating the radio link failure information and the minimization of drive tests information in the trace records associated with the same user equipment context.

2. A method, comprising:
receiving, at a network element in a radio resource control connected mode, a trace session activation request including a job type parameter indicating minimization of drive tests activation and a trace session reference configuration parameter;
generating a trace recording session reference configuration parameter;
causing an activation of a minimization of drive tests measurements at a user equipment;
receiving minimization of drive tests information from the user equipment;
associating the minimization of drive tests information with a user equipment context;
storing the minimization of drive tests information with the trace session reference configuration parameter and the trace recording session reference configuration parameter within a trace record according to the user equipment context;
transmitting the trace record to a collection entity;
receiving, at the network element in a radio resource control connected mode, a trace session activation request including a job type parameter indicating radio link failure information collection;
receiving radio link failure information after a radio link failure;
associating the radio link failure information with the user equipment context;
storing the radio link failure information with the trace session reference configuration parameter and the trace recording session reference configuration parameter within a trace record;
transmitting the trace record to a trace collection entity; and
correlating the radio link failure information and the minimization of drive tests information according to the trace session reference configuration parameter and the trace recording session reference configuration parameter they are stored with.

3. The method of claim 1, further comprising:
filtering the received radio link failure information based on a radio link failure filtering parameter, wherein the trace session activation request further comprises the radio link failure filtering parameter.

4. The method of claim 1, wherein the radio link failure information is received from a user equipment.

5. The method of claim 1, wherein the radio link failure information is received from an evolved Node-B.

6. An apparatus, comprising:
a processor;
a memory including computer program code,
wherein the memory and the computer program code are configured to, with the processor, cause the apparatus, when operating in a radio resource control connected mode, at least to,
receive a trace session activation request including a job type parameter indicating minimization of drive tests activation;
activate a minimization of drive tests measurements at a user equipment;
receive minimization of drive tests information from the user equipment;
associate the minimization of drive tests information with a user equipment context;
store the minimization of drive tests information within a trace record according to the user equipment context;
transmit the trace record to a collection entity;
receive a trace session activation request including a job type parameter indicating radio link failure information collection;
receive radio link failure information after a radio link failure;

associate the radio link failure information with a user equipment context;
store the radio link failure information within a trace record;
transmit the trace record to a trace collection entity; and
correlate the radio link failure information and the minimization of drive tests information according to the user equipment context by identifying trace records associated with the same user equipment context and correlating the radio link failure information and the minimization of drive tests information in the trace records associated with the same user equipment context.

7. The apparatus of claim 6, wherein the memory and the computer program code are further configured to, with the processor, cause the apparatus at least to:
filter the received radio link failure information based on a radio link failure filtering parameter, wherein the trace session activation request further comprises the radio link failure filtering parameter.

8. The apparatus of claim 6, wherein the memory and the computer program code are further configured to, with the processor, cause the apparatus at least to receive the radio link failure information from a user equipment.

9. The apparatus of claim 6, wherein the memory and the computer program code are further configured to, with the processor, cause the apparatus at least to receive the radio link failure information from an evolved Node-B.

10. The apparatus of claim 6, where the apparatus comprises an evolved Node-B.

11. A non-transitory computer-readable medium, comprising a computer program embodied therein, configured to control a processor operating in radio resource control connected mode, to implement a method, the method comprising:
receiving a trace session activation request including a job type parameter indicating minimization of drive tests activation;
activating a minimization of drive tests measurements at a user equipment;
receiving minimization of drive tests information from the user equipment;
associating the minimization of drive tests information with a user equipment context;
storing the minimization of drive tests information within a trace record according to the user equipment context;
transmitting the trace record to a collection entity;
receiving a trace session activation request including a job type parameter indicating radio link failure information collection;
receiving radio link failure information after a radio link failure;
associating the radio link failure information with a user equipment context;
storing the radio link failure information within a trace record; and
transmitting the trace record to a trace collection entity; and
correlating the radio link failure information and the minimization of drive tests information, wherein the correlating the radio link failure information and the minimization of drive tests information comprises identifying trace records associated with the same user equipment context and correlating the radio link failure information and the minimization of drive tests information in the trace records associated with the same user equipment context.

12. A method, comprising:
receiving, at a network element in a radio resource control connected mode, a trace session activation request including a job type parameter indicating minimization of drive tests activation and radio link failure information collection;
receiving minimization of drive tests information and radio link failure information;
associating the minimization of drive tests information and the radio link failure information with a user equipment context;
correlating the minimization of drive tests information and the radio link failure information by identifying trace records associated with the same user equipment context and correlating the radio link failure information and the minimization of drive tests information in the trace records associated with the same user equipment context;
storing the minimization of drive tests information and the radio link failure information and identifying information on the user equipment context within a trace record according to the user equipment context; and
transmitting the trace record to a collection entity.

13. The method of claim 1, wherein the steps of the method are performed by an evolved Node-B.

14. An apparatus, comprising:
means for receiving, at a network element in a radio resource control connected mode, a trace session activation request including a job type parameter indicating minimization of drive tests activation;
means for activating a minimization of drive tests measurements at a user equipment;
means for receiving minimization of drive tests information from the user equipment;
means for associating the minimization of drive tests information with a user equipment context;
means for storing the minimization of drive tests information within a trace record according to the user equipment context;
means for transmitting the trace record to a collection entity;
means for receiving a trace session activation request including a job type parameter indicating radio link failure information collection;
means for receiving radio link failure information after a radio link failure;
means for associating the radio link failure information with a user equipment context;
means for storing the radio link failure information within a trace record;
means for transmitting the trace record to a trace collection entity; and
means for correlating the radio link failure information and the minimization of drive tests information by identifying trace records associated with the same user equipment context and correlating the radio link failure information and the minimization of drive tests information in the trace records associated with the same user equipment context.

15. A system, comprising at least:
an apparatus configured, when operating in a radio resource control connected mode, at least to,
receive a trace session activation request including a job type parameter indicating minimization of drive tests activation;
activate a minimization of drive tests measurements at a user equipment;

receive minimization of drive tests information from the user equipment;
associate the minimization of drive tests information with a user equipment context;
store the minimization of drive tests information and identifying information on the user equipment context within a trace record according to the user equipment context;
transmit the trace record to a collection entity;
receive a trace session activation request including a job type parameter indicating radio link failure information collection;
receive radio link failure information after a radio link failure;
associate the radio link failure information with a user equipment context;
store the radio link failure information and identifying information on the user equipment context within a trace record;
transmit the trace record to the trace collection entity; and the trace collection entity, wherein the trace collection entity is configured to correlate the radio link failure information and the minimization of drive tests information by identifying trace records associated with the same user equipment context and correlating the radio link failure information and the minimization of drive tests information in the trace records associated with the same user equipment context.

16. The method of claim 1, wherein the trace recording containing the minimization of drive tests information is transmitted to the collection entity separately from the trace record containing the radio link failure information with the trace session reference configuration parameter and the trace recording session reference configuration parameter.

* * * * *